(12) United States Patent
Arar et al.

(10) Patent No.: US 11,727,218 B2
(45) Date of Patent: Aug. 15, 2023

(54) DYNAMIC MODIFICATION OF PLACEHOLDER TEXT IN CONVERSATIONAL INTERFACES

(71) Applicant: International Business Machines Corporation, Armonk, NY (US)

(72) Inventors: Raphael I. Arar, Santa Cruz, CA (US); Robert J. Moore, San Jose, CA (US); Guangjie Ren, Belmont, CA (US); Margaret H. Szymanski, Santa Clara, CA (US); Eric Y. Liu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 16/172,632

(22) Filed: Oct. 26, 2018

(65) Prior Publication Data

US 2020/0134017 A1 Apr. 30, 2020

(51) Int. Cl.
*G06F 40/35* (2020.01)
*H04L 51/02* (2022.01)
(Continued)

(52) U.S. Cl.
CPC .............. *G06F 40/35* (2020.01); *G06F 3/017* (2013.01); *G06F 16/3322* (2019.01); *G06F 16/3329* (2019.01); *H04L 51/02* (2013.01)

(58) Field of Classification Search
CPC ......... G10L 13/08; G10L 15/22; G10L 15/30; G10L 15/18; G10L 15/1815; G10L 15/1822; G10L 15/26; G10L 15/16; G10L 15/19; G10L 2015/223; G10L 2015/225; G10L 25/51; G10L 25/30; G06F 40/35; G06F 40/30; G06F 40/289; G06F 40/284; G06F 40/295; G06F 16/3329;
(Continued)

(56) References Cited

U.S. PATENT DOCUMENTS 6,259,786 B1 7/2001 Gisby
6,346,952 B1 2/2002 Shtivelman
(Continued)

OTHER PUBLICATIONS

IBM, "Method for providing contextual information about previous communications with specific individuals," IP.com Prior Art Database, Technical Disclosure No. PCOM000191662D, Jan. 11, 2010, 3 pages.

*Primary Examiner* — Yogeshkumar Patel
(74) *Attorney, Agent, or Firm* — Zilka-Kotab, P.C.

(57) ABSTRACT

According to one embodiment, a computer-implemented method for dynamically modifying placeholder text in a conversational interface includes: processing a conversation log reflecting a conversation between a human user and an automated agent; determining, based at least in part on the processing: one or more capabilities of the automated agent; and/or a trajectory of the conversation; and dynamically modifying placeholder text in the conversational interface based at least in part on: the one or more capabilities of the automated agent; the trajectory of the conversation; or both the one or more capabilities of the automated agent and the trajectory of the conversation. Other embodiments in the form of systems and computer program products are also disclosed.

19 Claims, 3 Drawing Sheets

(51) Int. Cl.
*G06F 3/01* (2006.01)
*G06F 16/332* (2019.01)

(58) Field of Classification Search
CPC ............. G06F 16/345; G06F 16/90332; G06F 16/3322; G06F 16/335; G06F 16/9024; G06F 3/017; G06F 16/9535; G06F 17/279; G06F 17/28; G06F 17/2785; G06N 5/04; G06N 20/00; G06N 3/08; H04L 12/1831; H04L 51/02; H04L 51/04; H04L 51/063; H04L 51/16; G06Q 10/10; G06Q 30/02; G06Q 10/06; G06Q 30/016
USPC ........ 704/9, 15.04, 275, 5; 707/722, 17.059, 707/17.068, 17.094, 738, 999.005; 706/11, 46; 709/205; 715/254, 256, 705, 715/708, 712, 714, 753, 758
See application file for complete search history.

(56) References Cited

U.S. PATENT DOCUMENTS

| | | | |
|---|---|---|---|
| 6,871,322 | B2 | 3/2005 | Gusler et al. |
| 7,092,872 | B2 | 8/2006 | Polanyi et al. |
| 2002/0111811 | A1* | 8/2002 | Bares ................ G06Q 30/02 704/275 |
| 2010/0313119 | A1 | 12/2010 | Baldwin et al. |
| 2014/0067375 | A1* | 3/2014 | Wooters ................ G06F 40/35 704/9 |
| 2016/0162463 | A1 | 6/2016 | Baldwin et al. |
| 2016/0162563 | A1 | 6/2016 | Koster |
| 2017/0125008 | A1* | 5/2017 | Maisonnier ............ G06N 3/008 |
| 2019/0182382 | A1* | 6/2019 | Mazza ................ H04M 3/527 |

\* cited by examiner

DYNAMIC MODIFICATION OF PLACEHOLDER TEXT IN CONVERSATIONAL INTERFACES

BACKGROUND

The present invention relates to conversational interfaces, and more specifically, this invention relates to dynamically modifying placeholder text in a conversational interface.

Conventional chat interfaces, e.g. email, SMS text, online chat dialogs, chatbots, and the like may include functionality for facilitating a conversation, e.g. by suggesting a complete word to input into the interface based on partial input by a user. Other tools associated with conventional chat interfaces includes fixed buttons or visual elements of the interface that allow users to input predetermined words or phrases, such as an introductory/closing statement for a customer service agent.

While these conventional chat interfaces and associated functions provide static capabilities to facilitate a conversation, current technology does not provide any means for dynamically modifying or suggesting input at a higher level, e.g. entire utterances, leaving users to enter input according to their best understanding of the conversation and the recipient's comprehension and capabilities. Especially when the conversation is with an automated agent, the user's lack of knowledge regarding the automated agent's capabilities and comprehension can lead to difficulty conveying the desired information, obtaining a desired service, misunderstandings regarding the scope of a user's request or intent, or even complete breakdowns in communication.

Accordingly, it would be beneficial to provide systems, methods, and computer program products having the ability to dynamically modify or suggest textual input in conversational interfaces, and particularly to dynamically modify placeholder text in the context of conversing with an automated agent.

SUMMARY

According to one embodiment, a computer-implemented method for dynamically modifying placeholder text in a conversational interface includes: processing a conversation log reflecting a conversation between a human user and an automated agent; determining, based at least in part on the processing: one or more capabilities of the automated agent; and/or a trajectory of the conversation; and dynamically modifying placeholder text in the conversational interface based at least in part on: the one or more capabilities of the automated agent; the trajectory of the conversation; or both the one or more capabilities of the automated agent and the trajectory of the conversation.

According to another embodiment, a computer program product for dynamically modifying placeholder text in a conversational interface includes a computer readable storage medium having program instructions embodied therewith. The computer readable storage medium is not a transitory signal per se, and the program instructions are executable by a processor to cause the processor to perform a method. The method includes: processing, using the processor, a conversation log reflecting a conversation between a human user and an automated agent; determining, using the processor and based at least in part on the processing: one or more capabilities of the automated agent; and/or a trajectory of the conversation; and dynamically modifying, using the processor, placeholder text in the conversational interface based at least in part on: the one or more capabilities of the automated agent; the trajectory of the conversation; or both the one or more capabilities of the automated agent and the trajectory of the conversation.

According to yet another embodiment, a system for dynamically modifying placeholder text in a conversational interface includes: a processor; and logic integrated with the processor, executable by the processor, or integrated with and executable by the processor, the logic being configured to: process a conversation log reflecting a conversation between a human user and an automated agent; determine, based at least in part on the processing: one or more capabilities of the automated agent; and/or a trajectory of the conversation; and dynamically modify placeholder text in the conversational interface based at least in part on: the one or more capabilities of the automated agent; the trajectory of the conversation; or both the one or more capabilities of the automated agent and the trajectory of the conversation.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamic modification of placeholder text in communicating with an automated agent using text interfaces.

As referenced herein, the term "dynamic" actions shall be understood as an action taken based on analyzing historical conversation data from a present and/or past communication(s), as opposed to a static action that is based on a single, most recent input from a user.

According to one general embodiment, a computer-implemented method for dynamically modifying placeholder text in a conversational interface includes: processing a conversation log reflecting a conversation between a human user and an automated agent; determining, based at least in part on the processing: one or more capabilities of the automated agent; and/or a trajectory of the conversation; and dynamically modifying placeholder text in the conversational interface based at least in part on: the one or more capabilities of the automated agent; the trajectory of the conversation; or both the one or more capabilities of the automated agent and the trajectory of the conversation.

According to another general embodiment, a computer program product for dynamically modifying placeholder text in a conversational interface includes a computer readable storage medium having program instructions embodied therewith. The computer readable storage medium is not a transitory signal per se, and the program instructions are executable by a processor to cause the processor to perform a method. The method includes: processing, using the processor, a conversation log reflecting a conversation between a human user and an automated agent; determining, using the processor and based at least in part on the processing: one or more capabilities of the automated agent; and/or a trajectory of the conversation; and dynamically modifying, using the processor, placeholder text in the conversational interface based at least in part on: the one or more capabilities of the automated agent; the trajectory of the conversation; or both the one or more capabilities of the automated agent and the trajectory of the conversation.

According to yet another general embodiment, a system for dynamically modifying placeholder text in a conversational interface includes: a processor; and logic integrated with the processor, executable by the processor, or integrated with and executable by the processor, the logic being configured to: process a conversation log reflecting a conversation between a human user and an automated agent; determine, based at least in part on the processing: one or more capabilities of the automated agent; and/or a trajectory of the conversation; and dynamically modify placeholder text in the conversational interface based at least in part on: the one or more capabilities of the automated agent; the trajectory of the conversation; or both the one or more capabilities of the automated agent and the trajectory of the conversation.

Figure 1:
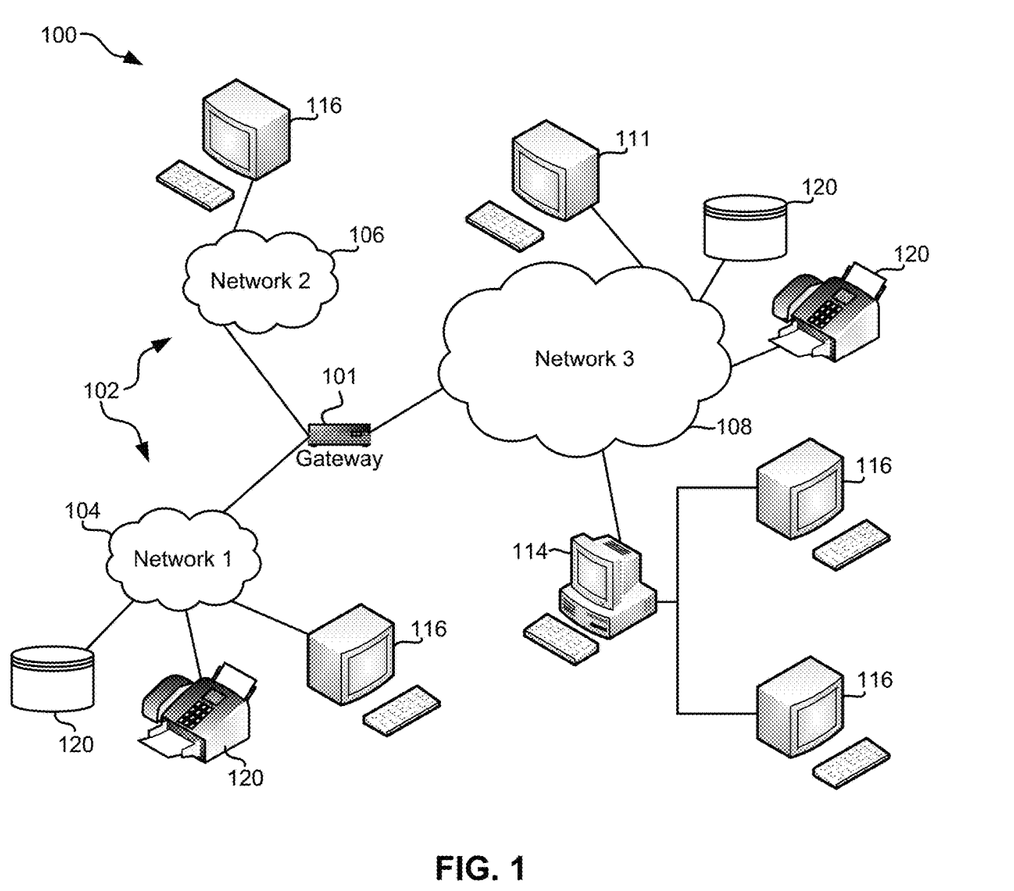
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
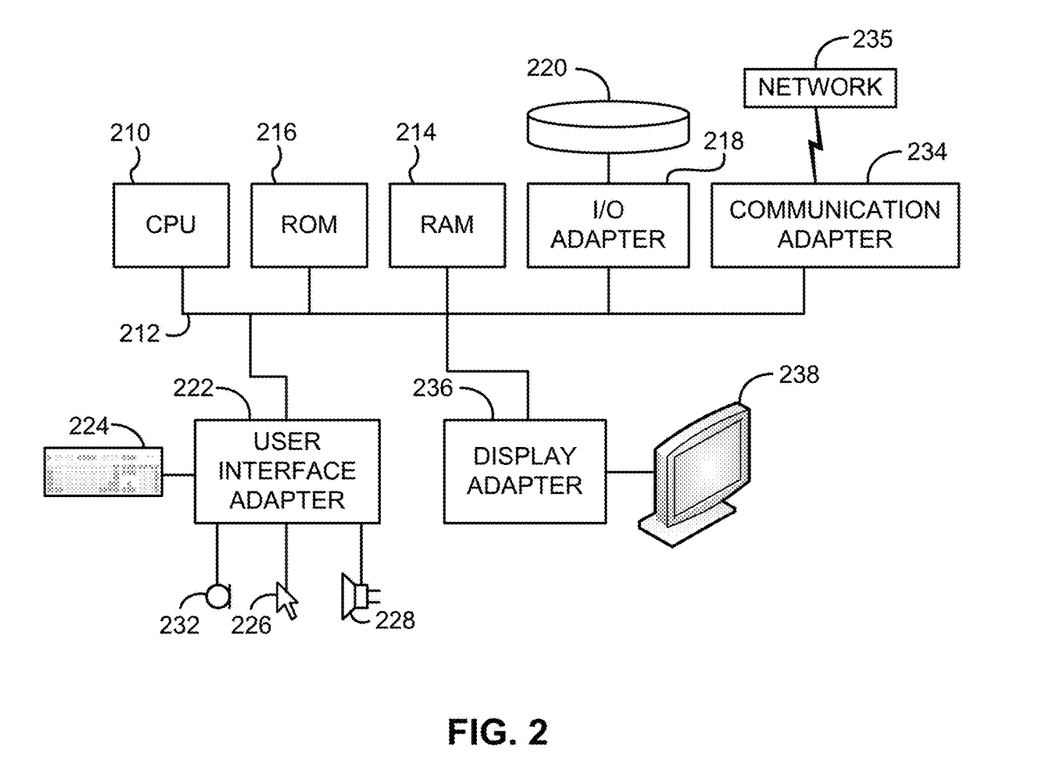
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Returning now to the notion of dynamic modification of placeholder text in a conversational interface, in preferred embodiments the presently disclosed inventive concepts include one or more conversations between a user and an automated agent. Based on analyzing the conversation(s) as a whole, the trajectory and/or agent capabilities may be determined, and placeholder text may be dynamically modified to guide the user regarding how to interact with the automated agent, and improve the overall experience and delivery of services to the user.

Figure 3:
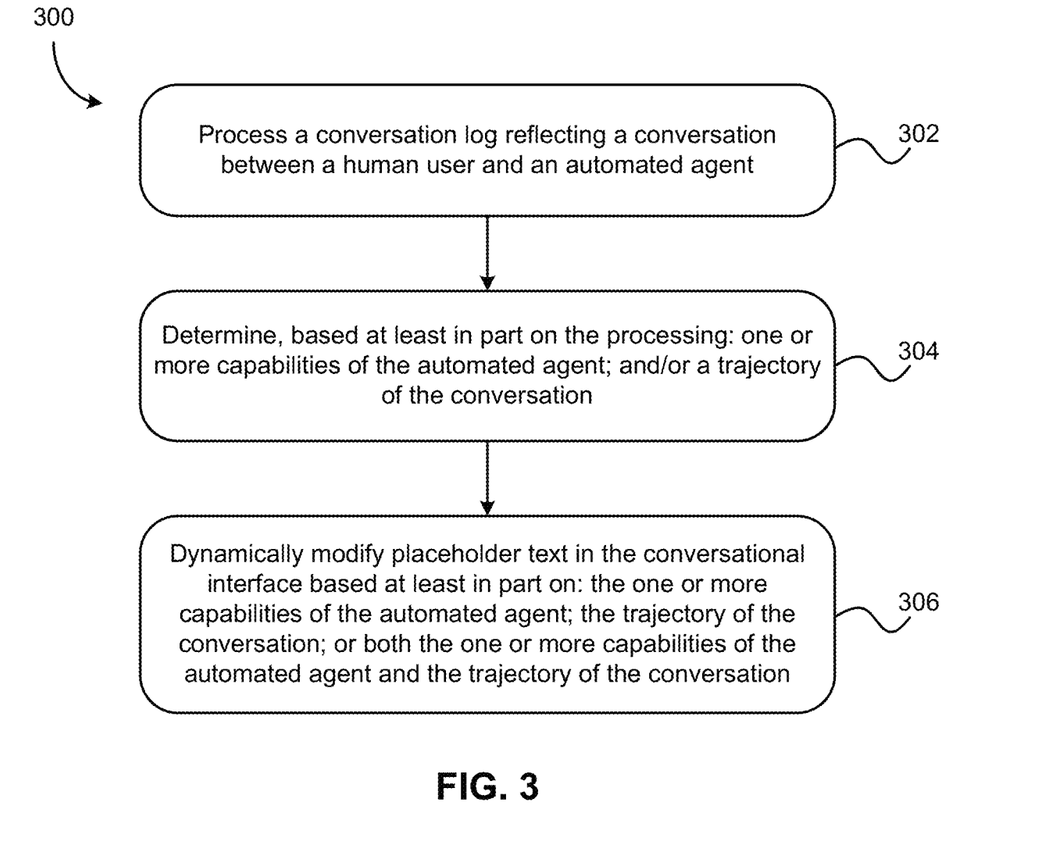
FIG. 3 illustrates a flowchart of a method, in accordance with one embodiment.

Accordingly, and now referring to FIG. 3, a flowchart of a method 300 is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 for dynamically modifying placeholder text in a conversational interface may initiate with operation 302, where a conversation log reflecting a conversation between a human user and an automated agent is processed. Of course, multiple conversation logs may be processed in alternative embodiments, but importantly only one conversation log (or a portion thereof, in some approaches) is required for the invention to function.

Preferably, the processing comprises natural language processing (NLP). In various embodiments, the natural language processing (NLP) may employ any suitable model or technique that would be understood by a person having ordinary skill in the art. For instance, in one approach a bag of words model may be employed to investigate/reflect frequency of use of particular terms in a conversation history. In another embodiment, a neural network may be employed, e.g. to derive context regarding the use of particular terms and/or utterances over time by the user.

More preferably, the processing performed in operation 302 identifies utterances by the user, and wherein the determining is performed based on the utterances rather than any given single word in any given response from the user in the conversation log. By operating on an utterance level of granularity, the presently disclosed inventive concepts, according to several embodiments, are capable of deriving more context regarding the conversation trajectory, agent capabilities, etc. and provide more relevant suggestions/ options when dynamically modifying the placeholder text.

With continuing reference to FIG. 3, in operation 304 and based at least in part on the result of processing the conversation log, one or more capabilities of the automated agent; and/or a trajectory of the conversation are determined.

User agent capabilities should be understood as including any suitable task, function, or operation capable of being performed by a computer, but preferably include capabilities relating to communication, scheduling, conducting business transactions, providing information, or any combination and/or equivalents thereof that would be understood by a person having ordinary skill in the art upon reading the present descriptions.

In some approaches, agent capabilities may be provided ab initio and thus known for all subsequent conversations. In more embodiments, the agent capabilities may be determined based on analyzing the conversation log(s). For instance, in the latter case an affirmative response to a user's inquiry/request for assistance of a particular type may be an indication of the agent's capabilities.

The trajectory of the conversation, in various embodiments, represents the nature of the subject matter being discussed, e.g. a topic of the conversation; the user's options regarding a particular conversation, e.g. placing an order, researching a topic, etc.

Whether the agent capabilities, conversation trajectory, or both are determined in operation 304, operation 306 of method 300 includes dynamically modifying placeholder text in the conversational interface based at least in part on the one or more capabilities of the automated agent; the trajectory of the conversation; or both the one or more capabilities of the automated agent and the trajectory of the conversation.

As one option for operation 306, the placeholder text may be modified additionally based on, and/or in response to, receiving gesture input from the user. For example, a user interacting with the conversation interface via a mobile device may physically put the device down, which may be indicative the user has left the conversation temporarily or terminated the communication. This action may be detected based on data from an accelerometer, magnetometer, and/or gyroscope integrated with the mobile device. In such an example, upon the user picking the device back up and placing the device in a suitable position for additional interaction with the conversational interface, e.g. at a certain angle relative to the Earth's gravitational axis, a certain distance, and/or when a user's face is recognizable by the mobile device, placeholder text may be dynamically modified to remind the user where the conversation left off, and/or seek input regarding any unanswered questions/ unresolved topics from the conversation prior to the interruption. In this manner, the conversation may be resumed seamlessly, without the user having to recall or look up what the subject of the conversation was, and any position the user may have expressed or supported.

In more embodiments, the gesture may be a gesture input to the conversational interface and/or the mobile device implementing the conversational interface, such as a double tap, a pinch, a spread motion, a swipe up, down, left or right, or any other suitable gesture that would be appreciated by a person having ordinary skill in the art upon reading the present descriptions. The gesture is preferably received via a display of the mobile device.

Of course, in additional embodiments the user may additionally or alternatively provide auditory input, and the placeholder text may be dynamically modified in response thereto. For instance, a user may ask a detailed question of an automated agent, and the agent may be incapable of comprehending the scope or nature of the inquiry. Placeholder text (which in some approaches may be provided in the form of, or in addition to, audio output, and may seek clarification from the user, e.g. "I'm sorry, I didn't catch that, would you like to: (a), (b), or (c)." instead of simply stating "I didn't catch that, please repeat." In more approaches, the automated agent may suggest possible responses, e.g. "You can say/type things like 'I want to go to the beach" or "I am looking for an inexpensive vacation.'"

In various embodiments, method 300 is not limited to the features, operations, and limitations specifically shown in FIG. 3 and described hereinabove. Rather, method 300 may be employed in any suitable environment/manner described herein, and may include any number of additional or alternative features, limitations, operations, functionalities, etc. described herein, in any combination, without departing from the scope of the inventive concepts described herein.

For instance, in one embodiment, dynamically modifying placeholder text may include any suitable form of guiding the user in providing an appropriate response with respect to the automated agent's capabilities and/or the trajectory of the conversation.

In another exemplary approach the automated agent is configured to facilitate scheduling an activity, such as making reservations, appointments, etc. at various locations of interest, reserving a seat or table at a restaurant, setting up an appointment with a doctor, hair stylist, automobile repair shop, etc., obtaining tickets to a play, sporting event, movie, etc., or any other form of scheduling an activity, as would be understood by skilled artisans having read the present descriptions in full.

Accordingly, and depending on the nature of the conversation, dynamically modifying placeholder text may include providing a hint or suggestion to the user regarding what input to provide, and/or the capabilities of the automated agent, in preferred approaches. For example, placeholder text may be modified from a default value, e.g. "Enter a reply" to a more specific prompt based on the determined trajectory of the conversation and/or agent capabilities, such as "where would you like to go" upon determining a conversation relates to travel and/or the agent is capable of making travel arrangements; "what would you like to eat" upon determining a conversation relates to a food order and/or the agent is capable of submitting orders to restaurants, etc. in various approaches.

Of course, other equivalent dynamic modifications of placeholder text depending on the particular nature/trajectory of a given conversation, and/or capabilities of a particular agent may be employed without departing from the scope of the presently disclosed inventive concepts, in various embodiments and as would be appreciated by a person having ordinary skill in the art upon reading the present description.

Moreover, while method 300 expressly contemplates analyzing a given conversation to determine agent capabilities and/or trajectory, it will be understood that in additional approaches the method 300 may involve analyzing logs or histories of multiple conversations, especially where multiple conversations between the automated agent and a particular user are available, e.g. in a knowledge base of conversations stored by the automated agent or otherwise accessible to the automated agent. This particular approach is advantageous in that user-specific behaviors, patterns, language, etc. may be learned over time and the placeholder text modifications may dynamically improve based on the additional context and knowledge regarding the user's preferences. For instance, a user profile may be built based on one or more conversations, and supplemented over time to refine the system's understanding of the user's preferences, adapt to changing preferences over time, etc. in various embodiments and to great advantage.

For example, if a user has previously visited a particular location, or ordered food from a particular restaurant, then upon the user mentioning the particular location or restaurant, the placeholder text may be dynamically modified to remind the user of the previous visit/order details, and offer the user the opportunity to essentially repeat some or all of the previous visit/order. Additionally or alternatively, the placeholder text may be dynamically modified to suggest similar locations/restaurants the user may be interested in visiting/patronizing. Of course, skilled artisans will appreciate that the inventive concepts described herein are in no way limited to visiting particular locations or ordering food from particular restaurants, but rather any historical user behavior/preferences may be analyzed and used to generate predictions/suggestions for the user via dynamically modifying placeholder text.

In still more embodiments, optionally upon determining a trajectory of a given conversation, e.g. a food order, select conversations relating to the same trajectory (or a topic therein/thereof) may be analyzed to the exclusion of other conversations stored in the knowledge base. In this manner, the system can adapt not only to the user's preferences generally, but also to specific preferences in different contexts, e.g. food, shopping, entertainment, conducting business transactions, etc. as would be understood by a person having ordinary skill in the art upon reading the instant descriptions.

In certain approaches, the placeholder text is modified based additionally on taking into account: a last response or set of responses from the automated agent; a last response or set of responses from the human user; or the last response or set of responses from the automated agent and the last response or set of responses from the human user.

As will be appreciated by skilled artisans upon reading the present descriptions, a conversation log advantageously provides context regarding the subject and nature of a given conversation, but in some cases may also be misleading or irrelevant to the current state of a conversation. For instance, conversations may wander from one topic to another, or may represent a synthesis of various topics raised and/or discussed throughout the course of a conversation, in different embodiments.

Where a conversation wanders, the history reflected in the log may not be relevant, or may be only partially relevant, to the current topic/state of the conversation. To account for this possibility, analyzing a latest response, or most recent set of responses (e.g. most recent 2-5 responses from either or both parties) may focus the manner in which placeholder text is dynamically modified. For instance, responses in a conversation log may be weighted according to relevance, and a most recent n responses from the user and/or automated agent may be assigned a higher weight based on temporal proximity since more recent responses are more likely to be relevant to a current topic of the conversation. The value of n may be predetermined, e.g. a default value or user-defined value, and/or may be learned and refined over time to better reflect a user's conversational behavior with respect to the automated agent.

Moreover, the placeholder text may be dynamically modified in response to determining a threshold amount of time since a last response in the conversation has elapsed.

In various embodiments, the threshold amount of time may be predetermined, e.g. a default value or a value set by the user, or may be determined based on observing conversational behavior of the user over time. For instance, the threshold amount of time may be set to an average user response time, i.e. an average amount of time between the user receiving a communication from the automated agent and the user entering a response to that communication. In more embodiments, the threshold amount of time may be set to a multiple of the average user response time, e.g. twice the average user response time, three times the average user response time, five times the average user response time, etc. as would be understood by a person having ordinary skill in the art upon reading the present disclosure.

Preferably, the threshold amount of time is set to a value permitting some leniency in user responses, e.g. to allow a user to think about various options regarding how to reply to a particular message from the automated agent, but also accurately reflecting a temporal boundary between the user remaining engaged in the conversation, and the user having effectively left the conversation, e.g. by shifting attention to another task, physically leaving the computer/device providing the conversational interface, etc. as would be appreciated by a person having ordinary skill in the art upon reading the present disclosure. At any rate, by providing a dynamically modified placeholder in response to determining the threshold amount of time since a last user response has elapsed, the user may be reminded of the context of the conversation, and/or provide a relevant reply more quickly and accurately due to the prompt.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for dynamically modifying placeholder text in a conversational interface, the method comprising:
    processing a conversation log reflecting a conversation between a human user and an automated agent;
    determining, based at least in part on the processing:
        one or more capabilities of the automated agent; and
        a trajectory of the conversation, wherein the trajectory of the conversation comprises either or both of:
            a topic of the conversation, and
            one or more options for the human user regarding the conversation; and
    dynamically modifying placeholder text in the conversational interface based at least in part on:
        auditory input from the human user;
        the one or more capabilities of the automated agent; and
        the trajectory of the conversation; and
    wherein dynamically modifying the placeholder text comprises:
        providing a hint, a suggestion, or a hint and a suggestion to the human user, via a mobile device, regarding either or both of:
            a type of input to provide in response to a prompt from the automated agent; and
            the one or more capabilities of the automated agent.

2. The computer-implemented method of claim 1, wherein the conversation log comprises a plurality of responses from the automated agent and a plurality of responses from the human user;
    wherein the responses from the automated agent and the responses from the human user are weighted according to relevance to a current state of the conversation; and
    wherein the placeholder text is dynamically modified based additionally on:
        a last response or set of responses from the automated agent;
        a last response or set of responses from the human user; and
        the last response or set of responses from the automated agent and the last response or set of responses from the human user.

3. The computer-implemented method of claim 1, wherein the placeholder text is dynamically modified in response to determining a threshold amount of time since a last response in the conversation has elapsed; and
    wherein the threshold amount of time is a multiple of an average user response time in a range from about twice the average user response time to about five times the average user response time.

4. The computer-implemented method of claim 1, comprising receiving gesture input from the human user via one or more sensors of a mobile device, wherein the gesture input is selected from the group consisting of: putting the mobile device down, picking the mobile device up, orienting the mobile device at a certain angle relative to the Earth's gravitational axis, moving the mobile device for a predetermined distance or more, a double tap on a display of the mobile device, a pinch on the display of the mobile device, a spread motion on the display of the mobile device, a swipe up on the display of the mobile device, a swipe down on the display of the mobile device, a swipe left on the display of the mobile device, a swipe right on the display of the mobile device, and combinations thereof; and
    wherein the placeholder text is dynamically modified based on the gesture input.

5. The computer-implemented method of claim 1, wherein dynamically modifying the placeholder text in the conversational interface is further based on one or more historically determined user preferences; and
    wherein dynamically modifying the placeholder text comprises:
        reminding the human user of details regarding a previous experience at a particular location; and either or both of:
            offering the human user an opportunity to repeat some or all of the previous experience at the particular location; and suggesting one or more similar locations the human user may be interested in visiting.

6. A computer program product for dynamically modifying placeholder text in a conversational interface, the computer program product comprising a computer readable storage medium having program instructions embodied therewith, wherein the computer readable storage medium is not a transitory signal per se, the program instructions executable by a processor to cause the processor to perform a method comprising:
processing, using the processor, a conversation log reflecting a conversation between a human user and an automated agent;
determining, using the processor and based at least in part on the processing:
one or more capabilities of the automated agent; and
a trajectory of the conversation, wherein the trajectory of the conversation comprises either or both of:
a topic of the conversation, and
one or more options for the human user regarding the conversation; and
dynamically modifying, using the processor, placeholder text in the conversational interface based at least in part on:
auditory input from the human user;
the one or more capabilities of the automated agent; and
the trajectory of the conversation; and
wherein dynamically modifying the placeholder text comprises:
providing a hint, a suggestion, or a hint and a suggestion to the human user, via a mobile device, regarding either or both of:
a type of input to provide in response to a prompt from the automated agent; and
the one or more capabilities of the automated agent.

7. The computer program product of claim 6, wherein the conversation log comprises a plurality of responses from the automated agent and a plurality of responses from the human user;
wherein the responses from the automated agent and the responses from the human user are weighted according to relevance to a current state of the conversation; and
wherein the placeholder text is dynamically modified based additionally on:
a last response or set of responses from the automated agent;
a last response or set of responses from the human user; and
the last response or set of responses from the automated agent and the last response or set of responses from the human user.

8. The computer program product of claim 6, wherein the placeholder text is dynamically modified in response to determining a threshold amount of time since a last response in the conversation has elapsed; and
wherein the threshold amount of time is a multiple of an average user response time in a range from about twice the average user response time to about five times the average user response time.

9. The computer program product of claim 6, comprising selecting, from among a knowledge base, one or more additional conversations relating to the trajectory of the conversation; and
analyzing the one or more additional conversations to determine one or more user preferences relating to the trajectory of the conversation; and
wherein dynamically modifying the placeholder text in the conversational interface is further based on the one or more user preferences relating to the trajectory of the conversation.

10. The computer program product of claim 6, comprising receiving gesture input from the human user via one or more sensors of a mobile device, wherein the gesture input is selected from the group consisting of: putting the mobile device down, picking the mobile device up, orienting the mobile device at a certain angle relative to the Earth's gravitational axis, moving the mobile device for a predetermined distance or more, a double tap on a display of the mobile device, a pinch on the display of the mobile device, a spread motion on the display of the mobile device, a swipe up on the display of the mobile device, a swipe down on the display of the mobile device, a swipe left on the display of the mobile device, a swipe right on the display of the mobile device, and combinations thereof; and
wherein the placeholder text is dynamically modified based on the gesture input.

11. The computer program product of claim 6, wherein dynamically modifying the placeholder text in the conversational interface is further based on one or more historically determined user preferences; and
wherein dynamically modifying the placeholder text comprises:
reminding the human user of details regarding a previous experience at a particular location; and either or both of:
offering the human user an opportunity to repeat some or all of the previous experience at the particular location; and
suggesting one or more similar locations the human user may be interested in visiting.

12. A system for dynamically modifying placeholder text in a conversational interface, comprising:
a processor; and
logic integrated with the processor, executable by the processor, or integrated with and executable by the processor, the logic being configured to:
process a conversation log reflecting a conversation between a human user and an automated agent;
determine, based at least in part on the processing:
one or more capabilities of the automated agent; and
a trajectory of the conversation, wherein the trajectory of the conversation comprises either or both of:
a topic of the conversation, and
one or more options for the human user regarding the conversation; and
dynamically modify placeholder text in the conversational interface based at least in part on:
auditory input from the human user;
the one or more capabilities of the automated agent; and
the trajectory of the conversation; and
wherein dynamically modifying the placeholder text comprises:
providing a hint, a suggestion, or a hint and a suggestion to the human user, via a mobile device, regarding either or both of:
a type of input to provide in response to a prompt from the automated agent; and
the one or more capabilities of the automated agent.

13. The system of claim 12, wherein the conversation log comprises a plurality of responses from the automated agent and a plurality of responses from the human user;

wherein the responses from the automated agent and the responses from the human user are weighted according to relevance to a current state of the conversation; and wherein the placeholder text is dynamically modified based additionally on:
- a last response or set of responses from the automated agent;
- a last response or set of responses from the human user; and
- the last response or set of responses from the automated agent and the last response or set of responses from the human user.

14. The system of claim 12, wherein the placeholder text is dynamically modified in response to determining a threshold amount of time since a last response in the conversation has elapsed; and
- wherein the threshold amount of time is a multiple of an average user response time in a range from about twice the average user response time to about five times the average user response time.

15. The system of claim 12, comprising selecting, from among a knowledge base, one or more additional conversations relating to the trajectory of the conversation; and
- analyzing the one or more additional conversations to determine one or more user preferences relating to the trajectory of the conversation; and
- wherein dynamically modifying the placeholder text in the conversational interface is further based on the one or more user preferences relating to the trajectory of the conversation.

16. The system of claim 12, comprising receiving gesture input from the human user via one or more sensors of a mobile device, wherein the gesture input is selected from the group consisting of: putting the mobile device down, picking the mobile device up, orienting the mobile device at a certain angle relative to the Earth's gravitational axis, moving the mobile device for a predetermined distance or more, a double tap on a display of the mobile device, a pinch on the display of the mobile device, a spread motion on the display of the mobile device, a swipe up on the display of the mobile device, a swipe down on the display of the mobile device, a swipe left on the display of the mobile device, a swipe right on the display of the mobile device, and combinations thereof; and
- wherein the placeholder text is dynamically modified based on the gesture input.

17. The system of claim 12, wherein dynamically modifying the placeholder text in the conversational interface is further based on one or more historically determined user preferences; and
- wherein dynamically modifying the placeholder text comprises:
  - reminding the human user of details regarding a previous experience at a particular location; and either or both of:
    - offering the human user an opportunity to repeat some or all of the previous experience at the particular location; and
    - suggesting one or more similar locations the human user may be interested in visiting.

18. The computer-implemented method of claim 1, wherein the one or more capabilities of the automated agent are determined based at least in part on one or more agent responses to an inquiry or a request for assistance of a particular type.

19. The computer-implemented method of claim 1, comprising:
- selecting, from among a knowledge base, one or more additional conversations relating to the trajectory of the conversation;
- analyzing the one or more additional conversations to determine one or more user preferences relating to the trajectory of the conversation; and
- receiving gesture input from the human user via one or more sensors of a mobile device, wherein the gesture input is selected from the group consisting of: putting the mobile device down, picking the mobile device up, orienting the mobile device at a certain angle relative to the Earth's gravitational axis, moving the mobile device for a predetermined distance or more, a double tap on a display of the mobile device, a pinch on the display of the mobile device, a spread motion on the display of the mobile device, a swipe up on the display of the mobile device, a swipe down on the display of the mobile device, a swipe left on the display of the mobile device, a swipe right on the display of the mobile device, and combinations thereof;
- wherein the one or more capabilities of the automated agent are determined based at least in part on one or more agent responses to an inquiry or a request for assistance of a particular type;
- wherein the processing comprises natural language processing (NLP);
- wherein the NLP employs a bag of words model;
- wherein the conversation log comprises a plurality of responses from the automated agent and a plurality of responses from the human user;
- wherein the responses from the automated agent and the responses from the human user are weighted according to relevance to a current state of the conversation; and
- wherein the placeholder text is dynamically modified in response to determining a threshold amount of time since a last response in the conversation has elapsed;
- wherein the threshold amount of time is a multiple of an average user response time in a range from about twice the average user response time to about five times the average user response time;
- wherein the placeholder text is dynamically modified based additionally on:
  - the one or more user preferences relating to the trajectory of the conversation;
  - the gesture input received from the human user;
  - a last response or set of responses from the automated agent;
  - a last response or set of responses from the human user; and/or
  - the last response or set of responses from the automated agent and the last response or set of responses from the human user; and
  - reminding the human user of details regarding a previous experience at a particular location; and either or both of:
    - offering the human user an opportunity to repeat some or all of the previous experience at the particular location; and
    - suggesting one or more similar locations the human user may be interested in visiting.

* * * * *